United States Patent
Krassner

(12) 
(10) Patent No.: US 9,738,115 B1
(45) Date of Patent: Aug. 22, 2017

(54) SYSTEM, AND APPARATUS FOR WHEEL DECORATION

(71) Applicant: Michael Krassner, St. Petersburg, FL (US)

(72) Inventor: Michael Krassner, St. Petersburg, FL (US)

( * ) Notice: Subject to any disclaimer, the term of this patent is extended or adjusted under 35 U.S.C. 154(b) by 0 days.

(21) Appl. No.: 15/375,707

(22) Filed: Dec. 12, 2016

(51) Int. Cl.
*B60B 7/00* (2006.01)
*B60B 7/06* (2006.01)
*B60B 7/04* (2006.01)

(52) U.S. Cl.
CPC .......... *B60B 7/0013* (2013.01); *B60B 7/0046* (2013.01); *B60B 7/0053* (2013.01); *B60B 7/04* (2013.01); *B60B 7/06* (2013.01); *B60B 2310/318* (2013.01); *B60B 2310/616* (2013.01); *B60B 2360/102* (2013.01); *B60B 2360/32* (2013.01); *B60B 2360/50* (2013.01); *B60B 2900/572* (2013.01)

(58) Field of Classification Search
CPC  B60B 7/00; B60B 7/0013; B60B 7/06; B60B 7/066; B60B 27/00
USPC ........................................... 301/108.1–108.3
See application file for complete search history.

(56) References Cited

U.S. PATENT DOCUMENTS

| 3,393,015 | A | * | 7/1968 | Kaufman | F16C 33/723 277/637 |
| 5,104,202 | A | * | 4/1992 | Branch | B60B 7/0013 301/108.1 |
| 6,217,220 | B1 | * | 4/2001 | Ohkuma | B60B 27/00 301/108.1 |
| 6,447,072 | B1 | * | 9/2002 | Johnson | F16C 33/664 301/108.2 |
| 6,676,227 | B1 | * | 1/2004 | Stanczak | B60B 7/002 301/108.1 |
| 2003/0132662 | A1 | * | 7/2003 | Vignotto | B60B 27/00 301/108.1 |
| 2004/0160115 | A1 | * | 8/2004 | Allsop | B60B 7/002 301/108.1 |
| 2006/0028059 | A1 | * | 2/2006 | Choe | B60B 7/20 301/108.1 |

* cited by examiner

*Primary Examiner* — Jason Bellinger
(74) *Attorney, Agent, or Firm* — Larson & Larson, P.A.; Frank Liebenow

(57) ABSTRACT

A central cover for covering a concave central axle cut-out area of a wheel includes a frame that is generally cup-shaped having a round outer surface. the round outer surface has a circumference smaller than an inner circumference of the concave central axle cut-out area of the wheel so that the central cover seats in the concave central axle cut-out area. A permanent magnet is seated within the frame for holding the central cover to the wheel. The permanent magnet having a central cutout area for clearance of an axle bolt when the axle bolt is present.

19 Claims, 3 Drawing Sheets

SYSTEM, AND APPARATUS FOR WHEEL DECORATION

FIELD

This invention relates to the field of automobiles and more particularly to a system and apparatus for wheel covering.

BACKGROUND

In recent years, many individuals have been attracted to automobiles that show various hardware features that have been hidden or camouflaged in the past. For example, several manufacturers of sport utility vehicles have produced vehicles having chrome plated bolts or screws as part of the design of those vehicles. Such bolts or screws are usually functional, securing components or trim, but in some circumstances, the bolts or screws are simply decorative.

It is apparent that owners of such vehicles take pride in the appearance of their vehicle and such visible hardware is desirable to those people.

Being such, some vehicles are equipped with after-market wheels that are decorative and often have exposed lug nuts, those typically being chrome plated. Alternately, some owners wish to keep their original equipment wheels, but for some vehicles, there is a cover over the central portion of the wheel where the lug nuts are located. The cover also hides the bearing or axle cut-out area of the wheel. Again, for many there is a desire to have visible lug nuts, moving this cover exposes the bearing or axle cut-out area that is not especially attractive to many.

Unfortunately, there has not been a way to successfully cover the bearing or axle cut-out area of the wheel with a decorative or ornamental device.

What is needed is a system and apparatus that will cover the bearing/axle cut-out of the wheel.

SUMMARY

In one embodiment, a central cover for covering a concave central axle cut-out area of a wheel is disclosed. The central cover includes a frame that is generally cup-shaped having a round outer surface. the round outer surface has a circumference smaller than an inner circumference of the concave central axle cut-out area of the wheel so that the central cover seats in the concave central axle cut-out area. A permanent magnet is seated within the frame for holding the central cover to the wheel. The permanent magnet having a central cutout area for clearance of an axle bolt when the axle bolt is present.

In another embodiment, a central cover for covering a concave central axle cut-out area of a wheel is disclosed. The central cover includes a frame that is generally cup-shaped having a round outer surface. A guard band encircles the round outer surface and the round outer surface and guard band have a circumference smaller than an inner circumference of the concave central axle cut-out area of the wheel so that the central cover seats in the concave central axle cut-out area. A permanent magnet is seated within the frame for holding the central cover to the wheel. The permanent magnet having a central cutout area for clearance of an axle bolt when the axle bolt is present.

In another embodiment, a central cover for covering a concave central axle cut-out area of a wheel is disclosed. The central cover includes a frame that is generally cup-shaped having a round outer surface and made of metal. A guard band that is made of rubber encircles the round outer surface and the round outer surface and guard band have a circumference smaller than an inner circumference of the concave central axle cut-out area of the wheel so that the central cover seats in the concave central axle cut-out area. A permanent magnet is seated within the frame for holding the central cover to the wheel. The permanent magnet having a central cutout area for clearance of an axle bolt when the axle bolt is present.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1A:
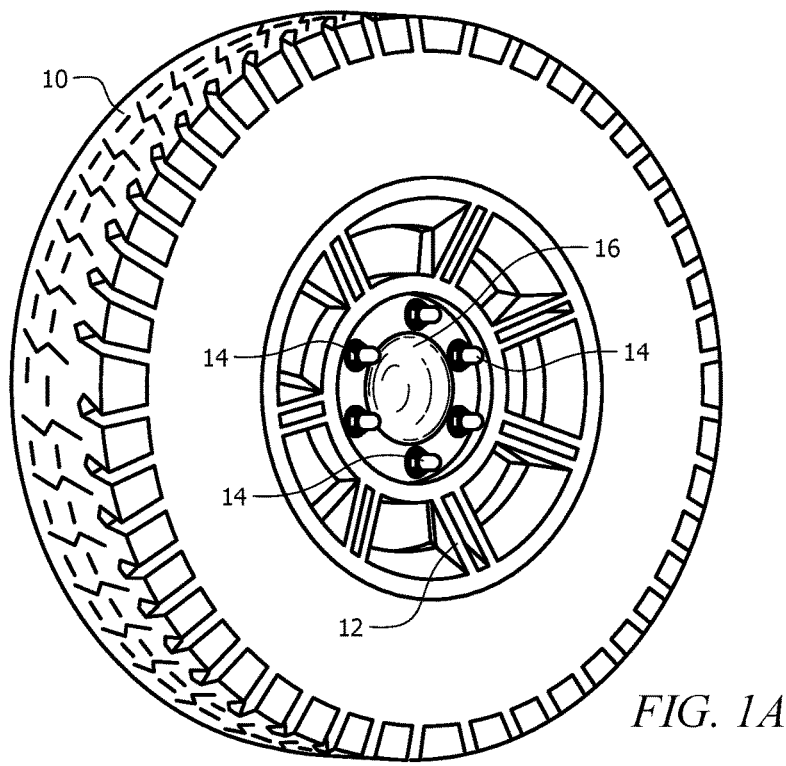
FIGS. 1A and 1B illustrate perspective views of an existing wheel with the wheel cover removed.

Reference will now be made in detail to the presently preferred embodiments of the invention, examples of which are illustrated in the accompanying drawings. Throughout the following detailed description, the same reference numerals refer to the same elements in all figures.

Throughout this description, the term, "axle bolt or axle cut-out area," refers to a central area of the wheel having, for example a concave shape for some wheels or, a convex/bulging shape for other wheels.

Figure 1B:
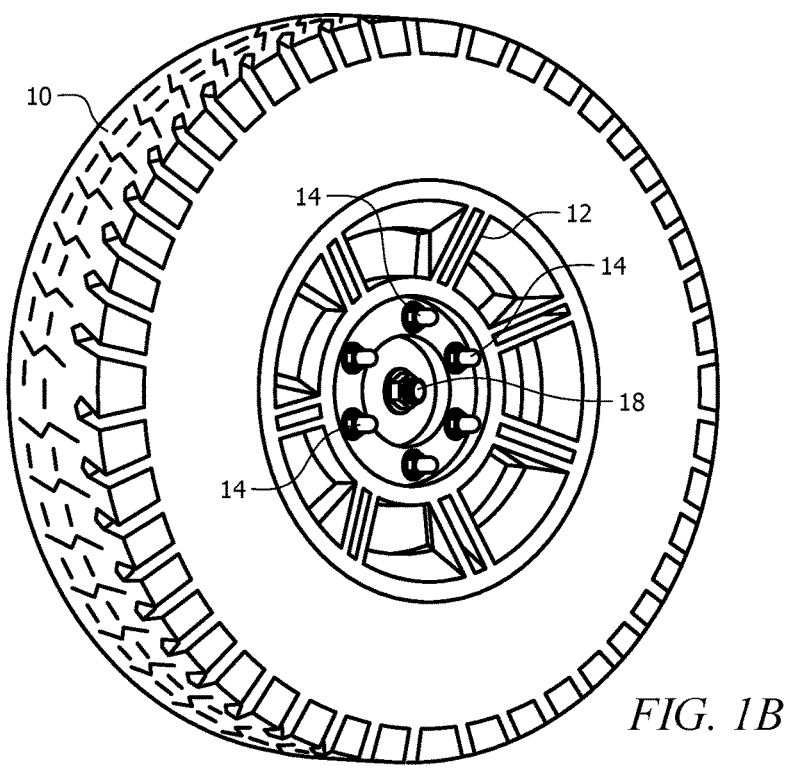

Referring to FIGS. 1A and 1B, perspective views of an existing wheel 12 with the wheel cover removed are shown. The wheel 12 is shown having a tire 10 and being held to the vehicle (not shown for clarity and brevity reasons) by a plurality of lug nuts 14.

The wheel 12 of FIG. 1A has a generally concave central axle cut-out area 16 while the wheel 12 has an axle bolt 18 extending from the central area. As discussed, many vehicle owners like showing the entire wheel portion and lug nuts 14, but find the central axle cut-out area 16 and the axle bolt 18 unappealing, especially as there is often rust in these areas/components.

Figure 2A:
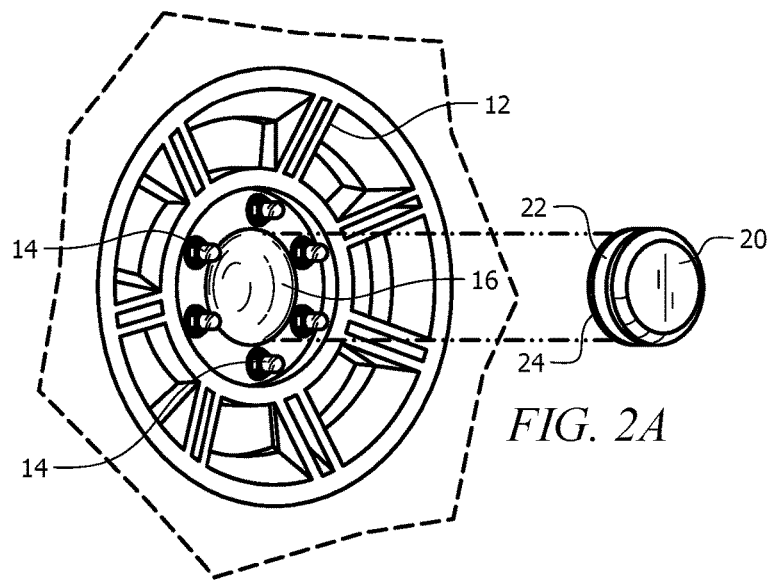
FIGS. 2A and 2B illustrate perspective views of an existing wheel with the wheel cover removed and the central cover of the present invention being installed.
Figure 2B:
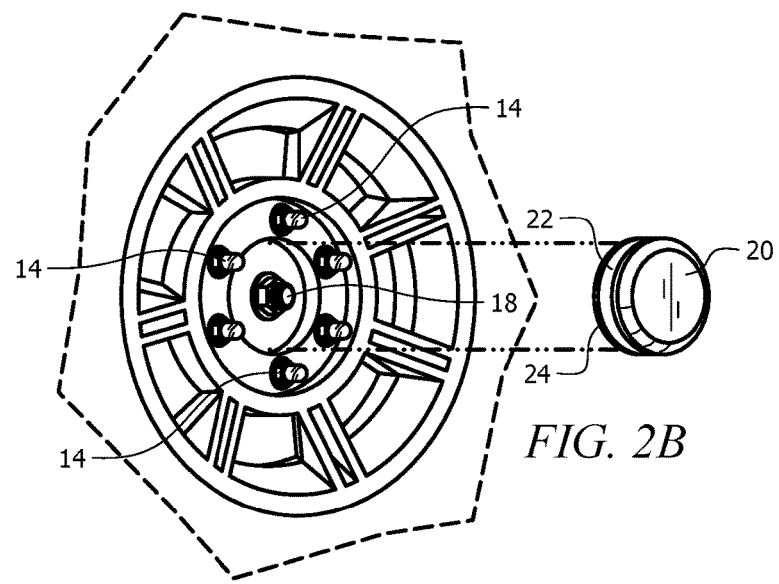

Referring to FIGS. 2A and 2B, perspective views of an existing wheel 14 with the wheel cover removed and the central cover 20 of the present invention being installed. Being that many vehicle wheels configured as shown in FIGS. 1A and 1B are designed to be covered by the wheel cover, there is no mechanical facility to cover the generally concave central axle cut-out area 16 or the axle bolt 18. For example, there are no mechanical features that will hold and bond a cover, being that such cover will be subject to high-speed rotation and shock during driving, especially at high speeds and/or on rough pavement.

To provide a pleasing look and to protect, for example, the axle bolt 18, the central cover 20 of the present invention is held to the wheel 12 by magnetic force. Details of an exemplary construction of the central cover 20 will be discussed along with FIG. 4. Note that the central cover 20 shown has an outer shell 24 with a guard band 22 that fits within the circumference 25 of either the generally concave central axle cut-out area 16 or the axle bolt 18.

Figure 3:
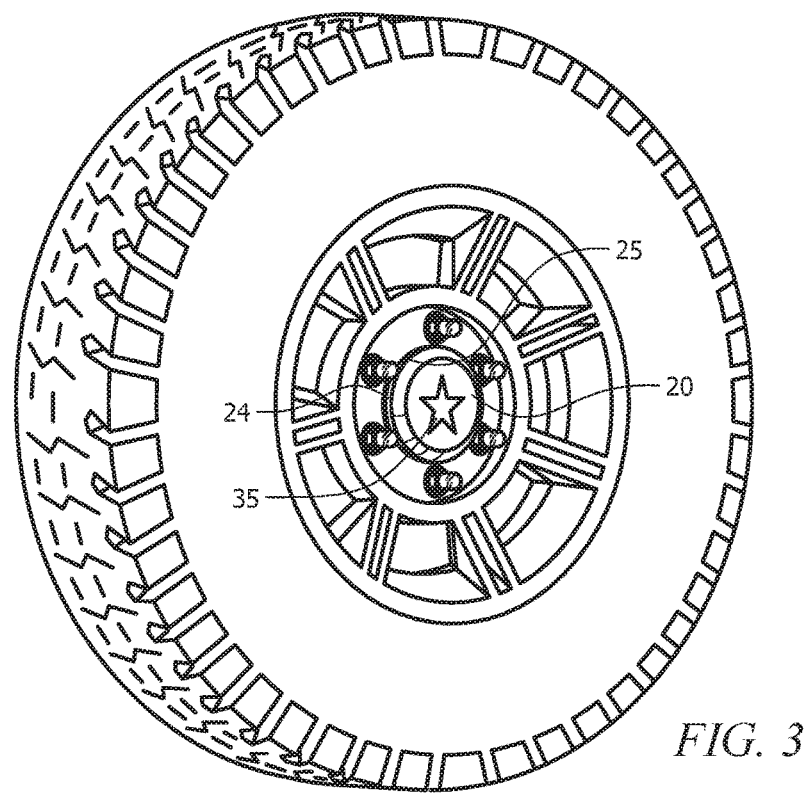
FIG. 3 illustrates a perspective view of an existing wheel with the wheel cover removed and the central cover of the present invention installed.

FIG. 3 illustrates a perspective view of an existing wheel 14 with the wheel cover removed and the central cover 20 of the present invention installed within the circumference of either the generally concave central axle cut-out area 16 or the axle bolt 18.

Figure 4:
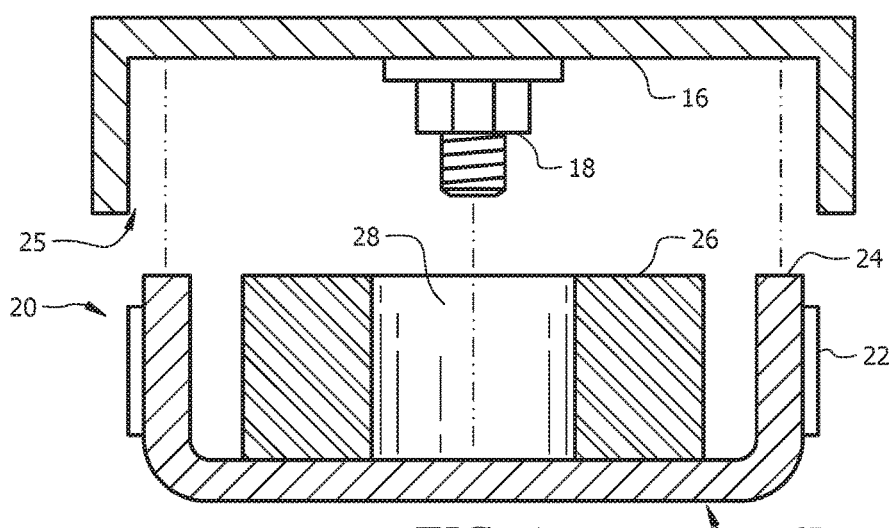
FIG. 4 illustrates a sectional view of the central cover installed over an axle bolt.

Referring to FIG. 4, a sectional view of the central cover 20 installed over an axle bolt 18 is shown. In this view, the permanent magnet 26 is visible. The permanent magnet 26 is bonded to the frame 24.

In some embodiments, the frame 24 is made of a material that is magnetically attracted, for example, including steel or iron. In such, the permanent magnet 26 holds to the frame 24 by magnetic force. In some embodiments, the frame 24 is made of a material that is not sufficiently magnetically attracted, for example, plastic. In such, the permanent magnet 26 is bonded to the frame 24 with, for example, an adhesive, double-sided tape, etc. The frame 24 is generally cup-shaped to fit within the concave central axle cut-out area 16 and to contain the permanent magnet 26 and, when present, the axle bolt 18.

In some embodiments, the frame 24 is coated, painted, textured, etc., for aesthetic reasons and to reduce corrosion. In some embodiments, a decorative figure or logo 35 is formed or installed on the face surface 27 of the frame 24, for example, a star or a logo 35 corresponding to the vehicle on which the central cover 20 is to be installed.

The permanent magnet 26 has a generally open central cutout area 28, providing clearance for the axle bolt 18 when installed on wheels 12 having an axle bolt 18. The generally concave central axle cut-out area 16 is typically made of a ferro-magnetic material (e.g. iron or steel). When the central cover 20 is placed into the concave central axle cut-out area 16, the permanent magnet 26 attracts and holds to the concave central axle cut-out area 16 by way of magnetic force. The magnetic force is strong enough to hold the central cover 20 within the concave central axle cut-out area 16 even under stress from rough pavement and high speed driving.

In some embodiments, a guard band 22 encircles the outer edge of the frame 24. The guard band 22 is typically made of a material that is softer and more pliable than the frame 24, allowing for variations in tolerance and providing an enclosed look when the central cover 20 is installed within the concave central axle cut-out area 16. In some embodiments, the guard band 22 is made of rubber, as in a thick rubber band. Another purpose for the guard band 22 is removal. As the permanent magnet 26 must be a very strong magnet, it is often impossible to remove the central cover 20 by hand without tools. By having the guard band 22, one is able to insert a tool between the concave central axle cut-out area 16 and the frame 24 (e.g., a screwdriver), displacing the guard band 22 and prying out the central cover 20.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A central cover for covering a concave central axle cut-out area of a wheel, the central cover comprising:
   a frame, the frame generally cup-shaped and having a round outer surface, the round outer surface having a circumference smaller than an inner circumference of the concave central axle cut-out area of the wheel; and
   a permanent magnet seated within the frame, the permanent magnet having a central cutout area for clearance of an axle bolt when the axle bolt is present;
   whereas the central cover has a continuous surface.

2. The central cover of claim 1, further comprising a guard band, the guard band encircling the round outer surface of the frame and the guard band made of a material that is softer and more pliable than a material of which the frame is made.

3. The central cover of claim 2, wherein the guard band is a rubber band.

4. The central cover of claim 1, wherein the frame is made of steel and the permanent magnet is held to the frame by magnetic force.

5. The central cover of claim 1, wherein the frame is made of a non-magnetic material and the permanent magnet is held to the frame by an adhesive.

6. The central cover of claim 5, wherein the non-magnetic material is plastic.

7. The central cover of claim 1, wherein an outer surface of the frame is coated.

8. A central cover for covering a concave central axle cut-out area of a wheel, the central cover comprising:
   a frame, the frame generally cup-shaped and having a round outer surface;
   a guard band encircling the round outer surface, the guard band and the round outer surface having an outer circumference smaller than an inner circumference of the concave central axle cut-out area of the wheel; and
   a permanent magnet seated within the frame, the permanent magnet having a central cutout area for clearance of an axle bolt when the axle bolt is present;
   whereas the central cover has a continuous surface.

9. The central cover of claim 8, wherein the guard band is made of a material that is softer and more pliable than a material of which the frame is made.

10. The central cover of claim 9, wherein the guard band is a rubber band.

11. The central cover of claim 8, wherein the frame is made of steel and the permanent magnet is held to the frame by magnetic force.

12. The central cover of claim 8, wherein the frame is made of a non-magnetic material and the permanent magnet is held to the frame by an adhesive.

13. The central cover of claim 12, wherein the non-magnetic material is plastic.

14. The central cover of claim 8, wherein an outer surface of the frame is coated.

15. A central cover for covering a concave central axle cut-out area of a wheel, the central cover comprising:
   a frame, the frame being cup-shaped and having a round outer surface, the frame made of metal;
   a guard band encircling the round outer surface, the guard band made of rubber, the guard band and the round outer surface having an outer circumference smaller than an inner circumference of the concave central axle cut-out area of the wheel; and a permanent magnet seated within the frame, the permanent magnet having a central cutout area for clearance of an axle bolt when the axle bolt is present;

whereas the central cover has a continuous surface.

16. The central cover of claim 15, wherein the metal is steel and the permanent magnet is held to the frame by magnetic force.

17. The central cover of claim 15, further comprising a decorative object formed or affixed to a face of the frame.

18. The central cover of claim 17, wherein the decorative object is a logo.

19. The central cover of claim 15, wherein at least an outer surface of a face of the frame is coated.

\* \* \* \* \*